US008848663B2

(12) United States Patent
Hapsari et al.

(10) Patent No.: US 8,848,663 B2
(45) Date of Patent: Sep. 30, 2014

(54) MOBILE COMMUNICATION SYSTEM

(75) Inventors: Wuri Andarmawanti Hapsari, Yokosuka (JP); Hideaki Takahashi, Yokohama (JP); Anil Umesh, Yokohama (JP); Mikio Iwamura, Tokyo (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 51 days.

(21) Appl. No.: 13/266,608

(22) PCT Filed: Apr. 23, 2010

(86) PCT No.: PCT/JP2010/057219
§ 371 (c)(1),
(2), (4) Date: Jan. 13, 2012

(87) PCT Pub. No.: WO2010/125975
PCT Pub. Date: Nov. 4, 2010

(65) Prior Publication Data
US 2012/0099516 A1    Apr. 26, 2012

(30) Foreign Application Priority Data

Apr. 28, 2009    (JP) ............................... P2009-110011

(51) Int. Cl.
| H04W 36/00 | (2009.01) |
| H04W 36/06 | (2009.01) |
| H04B 7/26 | (2006.01) |
| H04W 88/08 | (2009.01) |
| H04W 16/26 | (2009.01) |
| H04W 84/04 | (2009.01) |

(52) U.S. Cl.
CPC ............. *H04W 36/06* (2013.01); *H04B 7/2606* (2013.01); *H04W 88/085* (2013.01); *H04W 16/26* (2013.01); *H04W 84/047* (2013.01)
USPC .......................................... 370/331; 455/436

(58) Field of Classification Search
None
See application file for complete search history.

(56) References Cited

U.S. PATENT DOCUMENTS

2007/0218903 A1*    9/2007  Grech ........................... 455/436
2008/0316968 A1    12/2008  Sun et al.
(Continued)

FOREIGN PATENT DOCUMENTS

| GB | 2447885 A | 10/2008 |
| JP | 2012-186814 A | 9/2012 |

(Continued)

OTHER PUBLICATIONS

Office Action for Mexican Patent Application No. MX/a/2011/011385 dated Aug. 14, 2012, with English translation thereof (4 pages).

(Continued)

*Primary Examiner* — Hassan Phillips
*Assistant Examiner* — Duc Duong
(74) *Attorney, Agent, or Firm* — Osha Liang LLP

(57) ABSTRACT

A radio base station including a mobile communication system, a first relay node and a second relay node which are connected via a radio bearer, the second relay node and a radio base station which are connected via a radio bearer, where a mobile station is configured to perform a handover process between a first state, in which a radio bearer is set with the first relay node in order to communicate via the first relay node, the second relay node, and the radio base station, and a second state, in which a radio bearer is set with the radio base station in order to communicate via the radio base station, and a mobile station is configured such that during the handover process. Control signals involved in the handover process are sent and received via the radio bearer between the first relay node and the second relay node and via the radio bearer between the second relay node and the radio base station.

2 Claims, 8 Drawing Sheets

(56) References Cited

U.S. PATENT DOCUMENTS

| | | |
|---|---|---|
| 2009/0219852 A1 | 9/2009 | Youn et al. |
| 2010/0046418 A1* | 2/2010 | Horn et al. .................... 370/315 |
| 2010/0125631 A1* | 5/2010 | Zhang et al. .................. 709/204 |
| 2010/0173644 A1 | 7/2010 | Koyanagi |
| 2010/0208645 A1* | 8/2010 | Hamalainen et al. ......... 370/315 |
| 2010/0238900 A1* | 9/2010 | Johansson et al. ............ 370/331 |
| 2010/0260096 A1* | 10/2010 | Ulupinar et al. .............. 370/315 |
| 2012/0028631 A1* | 2/2012 | Chun et al. ................. 455/422.1 |
| 2012/0051349 A1* | 3/2012 | Teyeb et al. ................... 370/338 |
| 2012/0063417 A1* | 3/2012 | Redana et al. ................ 370/331 |
| 2012/0087338 A1* | 4/2012 | Brandt et al. ................. 370/331 |
| 2013/0010840 A1* | 1/2013 | Maddah-Ali et al. ......... 375/211 |

FOREIGN PATENT DOCUMENTS

| | | |
|---|---|---|
| WO | 2007/055544 A2 | 5/2007 |
| WO | 2007/119168 A2 | 10/2007 |
| WO | 2009/050794 A1 | 4/2009 |
| WO | 2009/139679 A1 | 11/2009 |

OTHER PUBLICATIONS

Texas Instruments, "On the design of relay node for LTE-advanced," 3GPP TSG RAN WG1 #56, R1-090593, Feb. 9-13, 2009, 11 pages.

3GPP TS 36.423 V10.3.0, Sep. 2011, "3rd Generation Partnership Project; Technical Specification Group Radio Access Network; Evolved Universal Terrestrial Radio Access Network (E-UTRAN); X2 application protocol (X2AP) (Release 10)," 132 pages.

International Search Report issued in PCT/JP2010/057219, mailed on Aug. 3, 2010, with translation, 4 pages.

Written Opinion issued in PCT/JP2010/057219, mailed on Aug. 3, 2010, 3 pages.

Extended European Search Report in corresponding European Application No. 10769674.2 dated May 3, 2013 (9 pages).

Official Action in counterpart Japanese Patent application No. 2012-250278 issued Dec. 3, 2013 (4 pages).

Office Action for corresponding Chinese Application No. 201080018533.2, mailed Oct. 25, 2013 (9 pages).

* cited by examiner

MOBILE COMMUNICATION SYSTEM

TECHNICAL FIELD

The present invention relates to a mobile communication system.

BACKGROUND ART

A mobile communication system of the LTE scheme (Release.8) defined by the 3GPP, as illustrated in FIG. 8, is configured such that when a handover process by a mobile station UE is carried out from a radio base station eNB#1 to a radio base station eNB#2, control signals involved in the handover process are sent and received between the radio base station eNB#1 and the radio base station eNB#2 via an X2 bearer that has been installed between the radio base station eNB#1 and the radio base station eNB#2.

As illustrated in FIG. 8, the radio base station eNB#1 and the radio base station eNB #2 include a network layer 1 (NW L1) function, a network layer 2 (NW L2) function, an IP (Internet Protocol) layer function, and an SCTP (Stream Control Transmission Protocol) layer function as the X2 bearer functions configured to establish the X2 bearer.

In an LTE-Advanced mobile communication system, which is the communication scheme that is the next-generation of the LTE scheme, "relay nodes RN" provided with the same functions as a radio base station eNB can establish a connection between a mobile station UE and the radio base station eNB.

However, the conventional mobile communication system has been problematic in that there is no regulation for how handover processes by the mobile station UE are to be handled when the relay nodes RN have been connected.

Therefore, the present invention is intended to over the above-described problem. An object of the present invention is to provide a mobile communication system capable of implementing a handover process of a mobile station even when relay nodes have been connected.

SUMMARY OF THE INVENTION

The first feature of the present invention is summarized in that a mobile communication system, a first relay node and a second relay node are connected via a radio bearer, the second relay node and a radio base station are connected via a radio bearer, a mobile station is configured to perform a handover process between a first state, in which a radio bearer is set with the first relay node in order to communicate via the first relay node, the second relay node, and the radio base station, and a second state, in which a radio bearer is set with the radio base station in order to communicate via the radio base station, and a mobile station is configured such that during the handover process, control signals involved in the handover process are sent and received via the radio bearer between the first relay node and the second relay node and via the radio bearer between the second relay node and the radio base station.

The first feature of the present invention is summarized in that The mobile communication system according to claim 1, the first relay node, upon receiving a measurement report from the mobile station, is configured to transfer the measurement report to the second relay node via the radio bearer between the first relay node and the second relay node, and the second relay node, upon deciding based on the measurement report to initiate the handover process in which the mobile station shifts from the first state to the second state, is configured to send a handover request signal giving notification of this intention, as a control signal involved in the handover process, to the radio base station via the radio bearer between the second relay node and the radio base station.

The first feature of the present invention is summarized in that The mobile communication system according to claim 1, the first relay node, upon deciding to initiate the handover process in which the mobile station shifts from the first state to the second state, is configured to send a handover request signal giving notification of this intention, as a control signal involved in the handover process, to the second relay node via the radio bearer between the first relay node and the second relay node, and the second relay node is configured to transfer the received handover request signal to the radio base station via the radio bearer between the second relay node and the radio base station.

As has been described above, according to the present invention, it is possible to provide a mobile communication system capable of implementing a handover process of a mobile station even when relay nodes have been connected.

DETAILED DESCRIPTION

Figure 1:
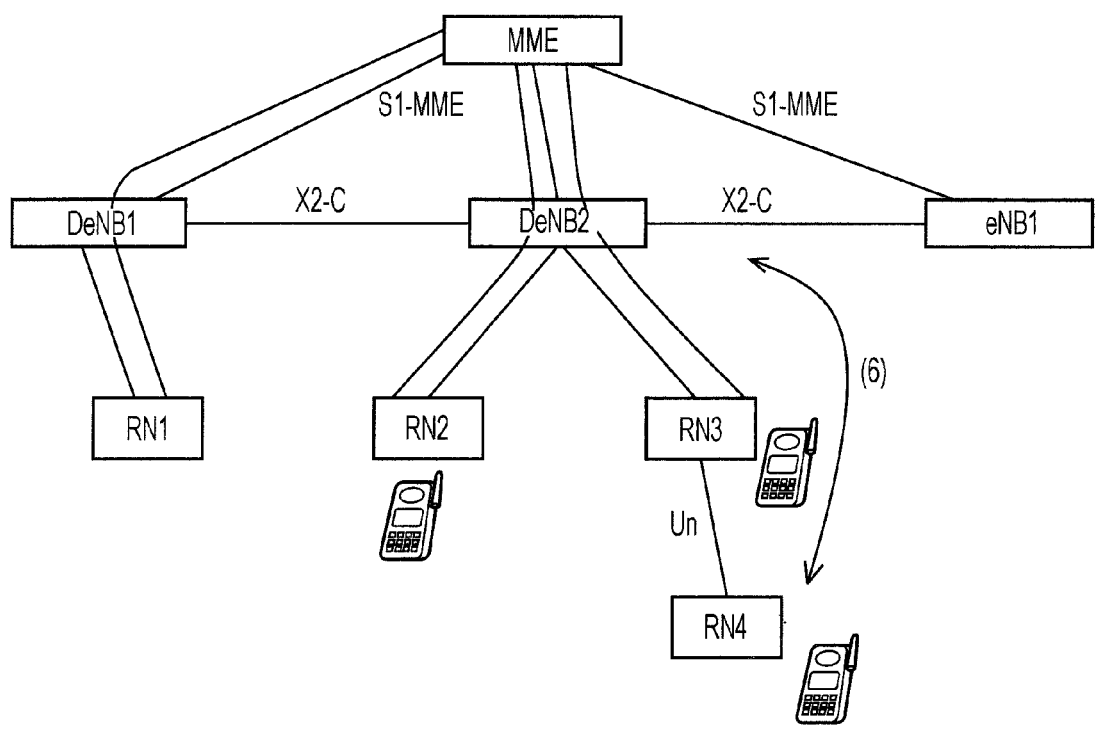
FIG. 1 is a diagram showing the entire configuration of the mobile communication system according to a first embodiment of the present invention.
Figure 2:
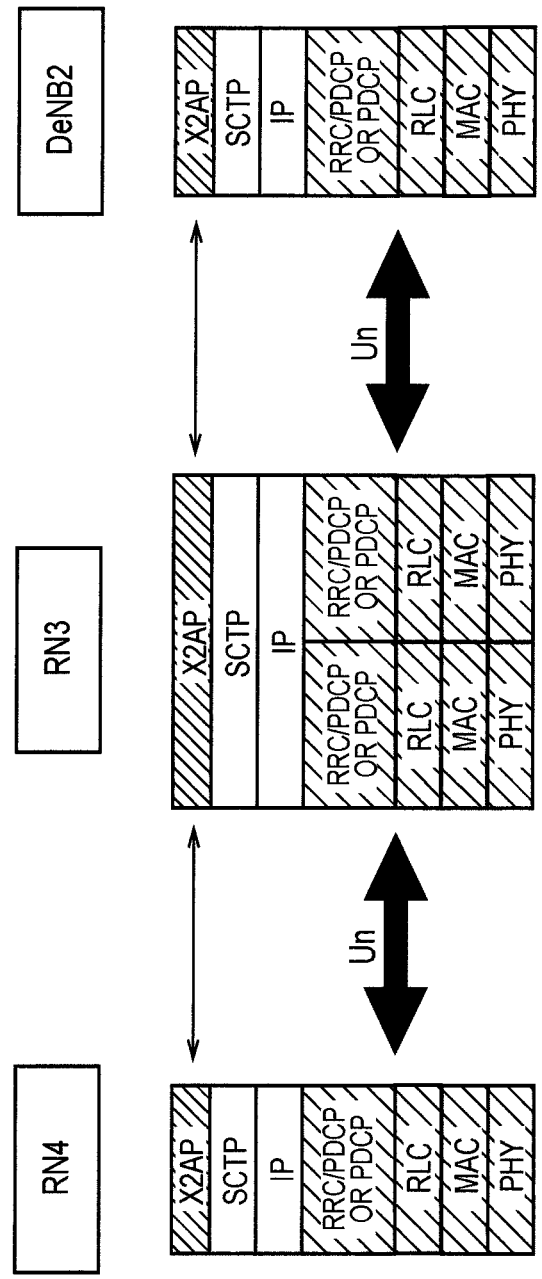
FIG. 2 is a diagram showing the protocol stack of the mobile communication system according to the first embodiment of the present invention.
Figure 3:
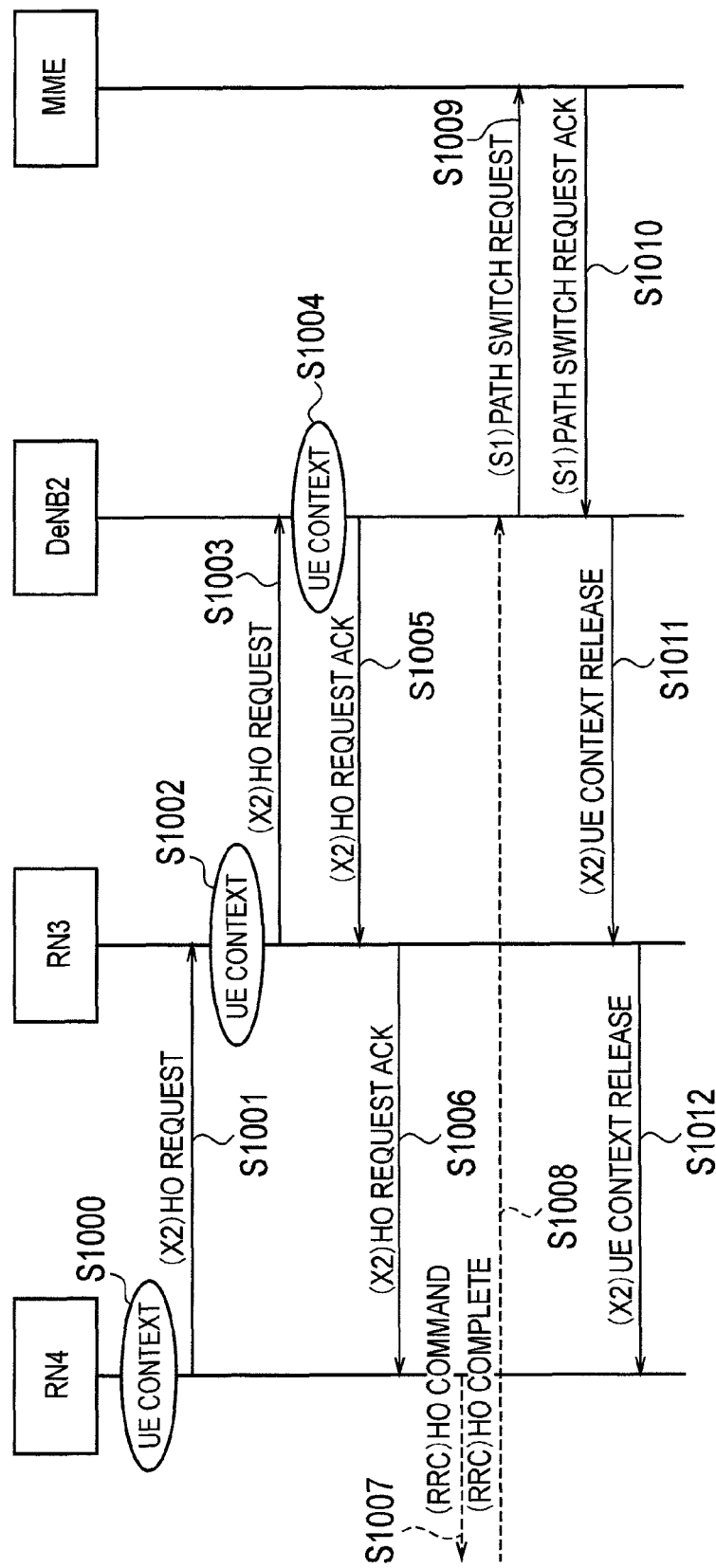
FIG. 3 is a sequence diagram illustrating the operation of the mobile communication system according to the first embodiment of the present invention.

Mobile Communication System According to a Second Embodiment of the Present Invention A description will be provided for the mobile communication system according to a first embodiment of the present invention, with reference to FIG. 1 to FIG. 3.

The mobile communication system according to the present invention is an LTE-Advanced mobile communication system including, for example, as illustrated in FIG. 1, a mobile switching center MME, relay nodes RN1 to RN4, a radio base station DeNB (Donor eNB) 1 that is connected by the relay node RN1, a radio base station DeNB2 that is connected to the relay nodes RN2 and RN3, and a radio base station eNB1.

Herein, the radio base station DeNB1 and the radio base station DeNB2 are connected via an X2-C interface, and the radio base station DeNB2 and the radio base station eNB1 are connected via an X2-C interface.

Also, the radio base station DeNB1, the radio base station DeNB2, and the radio base station eNB1 are respectively connected with the mobile switching center MME via S1-MME interfaces.

In such a mobile communication system, the mobile station UE is configured to set a radio bearer between the radio base stations eNB (DeNB) and the relay nodes RN in order to perform radio communication.

Also, in such a mobile communication system, as illustrated by (6) of FIG. 1, the mobile station UE is configured to conduct a handover process between a first state in which a radio bearer is set with the relay node RN4 (the first relay node) in order to communicate via the relay node RN4, the relay node RN3 (the second relay node), and the radio base station DeNB2 (the radio base station), and a second state in which a radio bearer is set with the radio base station DeNB2 in order to communicate via the radio base station DeNB2.

Additionally, in such a handover process, control signals (X2AP signals) involved in the handover process are configured to be sent and received via the radio bearer (Un interface) between the relay node RN4 and the relay node RN3, and via the radio bearer (Un interface) between the relay node RN3 and the radio base station DeNB2.

Note that in this embodiment, the configuration is such that no radio bearer (Un interface) is set between the relay node RN2 and the radio base station DeNB2.

Specifically, as illustrated in FIG. 2, as X-2C radio bearer functions configured to set the X2-C radio bearer (Un interface) with the relay node RN3, the relay node RN4 includes a physical (PHY) layer function, an MAC (Media Access Control) layer function provided as an upper layer function of the physical (PHY) layer function, an RLC (Radio Link Control) layer function provided as an upper layer function of the MAC layer function, and a PDCP (Packet Data Convergence Protocol) layer function provided as an upper layer function of the RLC layer function.

Note that the relay node RN4 may include an RRC (Radio Resource Control) layer function provided as an upper layer function of the PDCP layer function.

Moreover, as illustrated in FIG. 2, as an upper layer function of the X2-C radio bearer functions, the relay node RN4 may include an IP layer function configured to perform security processes between the relay node RN4 and the relay node RN3, and may include an SCTP layer function configured to perform keep-alive processes for the X2-C radio bearer as an upper layer function of the IP layer function.

Further, the relay node RN4 may include an X2AP layer function configured to send and receive control signals (for example, "HO Request", and "HO Request Ack") involved in the handover process as an upper layer function of the SCTP layer function.

Similarly, as X2-C radio bearer functions configured to establish an X2-C radio bearer with the relay node RN3 (Un interface), the radio base station DeNB2 includes a physical (PHY) layer function, an MAC layer function provided as an upper layer function of the physical (PHY) layer function, an RLC layer function provided as an upper layer function of the MAC layer function, and a PDCP layer function provided as an upper layer function of the RLC layer function.

Note that the radio base station DeNB2 may include an RRC layer function provided as an upper layer function of the PDCP layer function.

As an upper layer function of the X2-C radio bearer functions, the radio base station DeNB2 may also include an IP layer function configured to perform security processes between the relay node RN3 and the radio base station DeNB2, and may include an SCTP layer configured to perform keep-alive processes for the X2-C radio bearer as an upper layer function of the IP layer function.

The radio base station DeNB2 may also include an X2AP layer function configured to send and receive control signals involved in the handover process, as an upper layer function of the SCTP layer function.

The relay node RN3 also includes an X2-C radio bearer function configured set an X2-C radio bearer (Un interface) with the relay node RN4 and the radio base station DeNB2.

The relay node RN3 further includes an IP layer function provided as an upper layer function of the X2-C radio bearer function, with an SCTP function provided as an upper layer function of the IP layer function, and with an X2AP layer function provided as an upper layer function of the SCTP layer function.

A description is provided below with reference to FIG. 3 for the operation in the mobile communication system according to this embodiment where the mobile station UE is configured to conduct a handover from a first state in which a radio bearer is set with the relay node RN4 in order to communicate via the relay node RN4, the relay node RN3, and the radio base station DeNB2, to a second state in which a radio bearer is set with the radio base station DeNB2 in order to communicate via the radio base station DeNB2.

As illustrated in FIG. 3, the relay node RN4, which manages the "UE Context" of the mobile station UE, decides to perform a handover process in which the mobile station UE shifts from the first state to the second state in step S1000, and then, in step S1001, sends an "HO Request (handover request signal)", requesting a handover of the mobile station UE from the relay node RN4 to the radio base station DeNB2, to the relay node RN3 via the X2-C radio bearer.

The relay node RN3, upon receiving the "HO Request" by means of the X2AP layer function, stores the "UE Context" of the mobile station UE in step S1002, and transfers the "HO Request" to the radio base station DeNB2 via the X2-C radio bearer in step S1003.

The radio base station DeNB2, upon receiving the "HO Request", stores the "UE Context" of the mobile station UE in step S1004, and sends an "HO Request Ack (handover request acknowledgement signal)" to the relay node RN1 via the X2-C radio bearer in step S3005.

The relay node RN3, upon receiving the "HO Request Ack" by means of the X2AP layer function, transfers the "HO Request Ack" to the relay node RN4 via the X2-C radio bearer in step S1006.

In step S1007, the relay node RN4 sends an "HO Command (handover instruction signal)" to the mobile station UE by means of the RRC layer function, in order to instruct a handover to the radio base station DeNB2.

In step S1008, the mobile station UE sends an "HO Complete (handover completion signal)" to the radio base station DeNB2 by means of the RRC layer function.

In step S1009, the radio base station DeNB2 sends a "Path Switch Request (path switch request signal)" to the mobile switching center MME via the S1-MME interface.

In step S1010, the mobile switching center MME sends a "Path Switch Request Ack (path switch request acknowledgement signal)" to the radio base station DeNB2 via the S1-MME interface, and also switches the transfer destination for signals addressed to the mobile station UE from the relay node RN4 to the radio base station DeNB2.

In step S1011, the radio base station DeNB2 sends a "UE Context Release" to the relay node RN3 via the X2-C radio bearer, and then in step S1012, the relay node RN3 transfers the "UE Context release" to the relay node RN4 via the X2-C radio bearer by means of the X2AP layer function, such that the relay node RN4 terminates management of the "UE Context" of the mobile station UE in reaction to the "UE Context Release".

Note that in FIG. 3, the relay node RN4 and the radio base station DeNB2 may be interchangeable.

As described above, the X2AP layer function in the relay node RN3 is configured to convert the control signals (X2AP signals) involved in the handover process between the relay note RN4 and the relay node RN3, and the control signals (X2AP signals) involved in the handover process between the relay note RN3 and the radio base station DeNB2.

Further, the X2AP layer function in the relay node RN3 is configured to manage the mobile station ID that is used between the relay note RN4 and the relay node RN3 in association with the mobile station ID that is used between the relay note RN3 and the radio base station DeNB2.

According to the mobile communication system of this embodiment, it is possible to implement a handover process involving the relay nodes RN without performing a major renovation of the protocol stack of each device used in the LTE mobile communication system.

Figure 4:
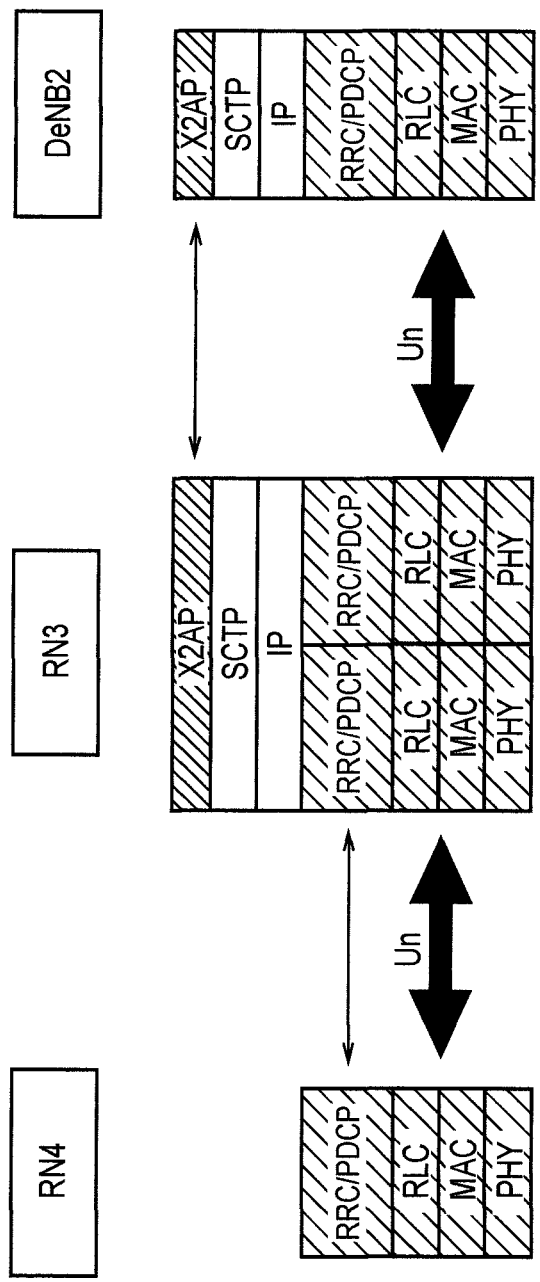
FIG. 4 is a diagram showing the protocol stack of the mobile communication system according to a second embodiment of the present invention.
Figure 5:
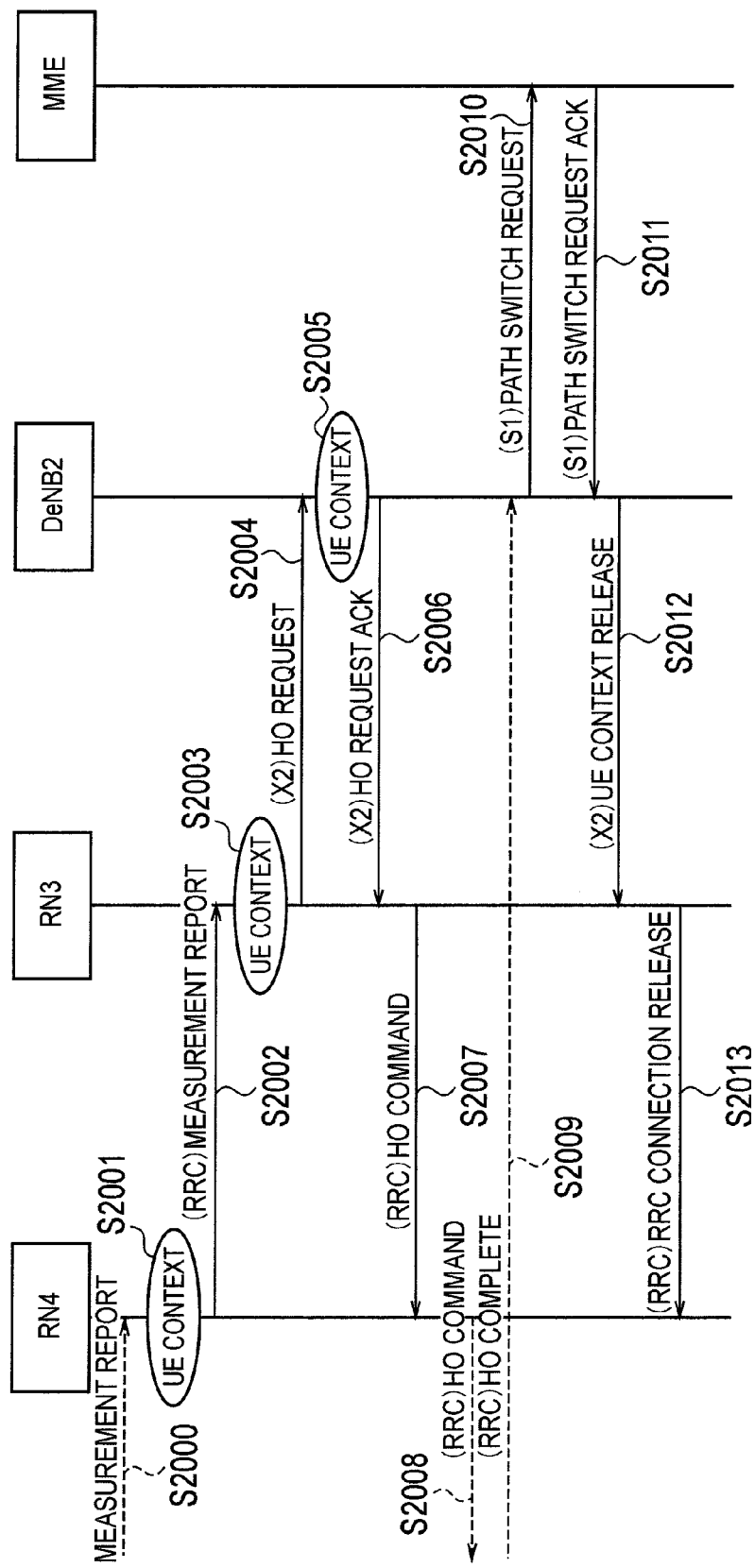
FIG. 5 is a sequence diagram illustrating the operation of the mobile communication system according to the second embodiment of the present invention.

Mobile Communication System According to a Second Embodiment of the Present Invention A description will be provided for the mobile communication system according to a second embodiment of the present invention, with reference to FIG. 4 and FIG. 5. The mobile communication system according to the second embodiment of the present invention will be described below by focusing on the differences from the mobile communication system according to the first embodiment described above.

Specifically, as illustrated in FIG. 4, the relay node RN4 includes various functions as X-2C radio bearer functions configured to set the X2-C radio bearer (Un interface) with the relay node RN3: such as a physical (PHY) layer function, an MAC layer function provided as an upper layer function of the physical (PHY) layer function, an RLC layer function provided as an upper layer function of the MAC layer function, and a PDCP layer function provided as an upper layer function of the RLC layer function.

Note that the relay node RN4 may include an RRC layer function provided as an upper layer function of the PDCP layer function.

Further, as illustrated in FIG. 4, the relay node RN4 is configured to operate as a proxy of the RRC layer function in the mobile station UE, and does not include an IP layer function configured to perform security processes between the relay node RN4 and the relay node RN3 as an upper layer function of the X2-C radio bearer function, nor with an SCTP layer function configured to perform keep-alive processes for the X2-C radio bearer, nor with an X2AP layer function configured to send and receive control signals involved in the handover process.

Further, the protocol stack of the radio base station DeNB2 and the relay node RN3 is the same as the protocol stack of the mobile communication system according to the first embodiment as illustrated in FIG. 2.

A description is provided below with reference to FIG. 5 for the operation in the mobile communication system according to this embodiment where the mobile station UE is configured to conduct a handover from a first state in which a radio bearer is set with the relay node RN4 in order to communicate via the relay node RN4, the relay node RN3, and the radio base station DeNB2, to a second state in which a radio bearer is set with the radio base station DeNB2 in order to communicate via the radio base station DeNB2.

As illustrated in FIG. 5, the relay node RN4, upon receiving a "Measurement Report (measurement report)" from the mobile station UE in step S2000, acquires the "UE Context" of the mobile station UE being managed in step S2001, and then in step S2002, transfers the "Measurement Report" including the "UE Context" of the mobile station UE to the relay node RN3 by means of the RRC layer function.

The relay node RN3 then decides to perform a handover process of the mobile station UE from the relay node RN4 to the radio base station DeNB2 based on the received "Measurement Report", stores the "UE Context" of the mobile station UE in step S2003, and then in step S2004, and sends an "HO Request (handover request signal)" to the radio base station DeNB2 via the X2-C radio bearer, in order to request a handover of the mobile station UE from the relay node RN4 to the radio base station DeNB2.

The radio base station DeNB2, upon receiving the "HO Request", stores the "UE Context" of the mobile station UE in step S2005, and sends an "HO Request Ack (handover request acknowledgement signal)" to the relay node RN2 via the X2-C radio bearer in step S3006.

The relay node RN3, upon receiving the "HO Request Ack", sends an "HO Command" (handover instruction signal) to the relay node RN4, in order to instruct a handover to the radio base station DeNB2 by means of the RRC layer function in step S2007.

In step S2008, the relay node RN4 transfers the received "HO Command" to the mobile station UE by means of the RRC layer function.

In step S2009, the mobile station UE sends an "HO Complete (handover completion signal)" to the radio base station DeNB2 by means of the RRC layer function.

In step S2010, the radio base station DeNB2 sends a "Path Switch Request (path switch request signal)" to the mobile switching center MME via the S1-MME interface.

In step S2011, the mobile switching center MME sends a "Path Switch Request Ack (path switch request acknowledgement signal)" to the radio base station DeNB2 via the S1-MME interface, and also switches the transfer destination for signals addressed to the mobile station UE from the relay node RN4 to the radio base station DeNB2.

In step S2021, the radio base station DeNB2 sends the "UE Context Release" to the relay node RN3 via the X2-C radio bearer.

In step S2013, the relay node RN3, transfers an "RRC Connection Release" to the relay node RN4 by means of the RRC layer function, and the relay node RN4 terminates management of the "UE Context" of the mobile station UE in reaction to the "RRC Connection Release".

Figure 6:
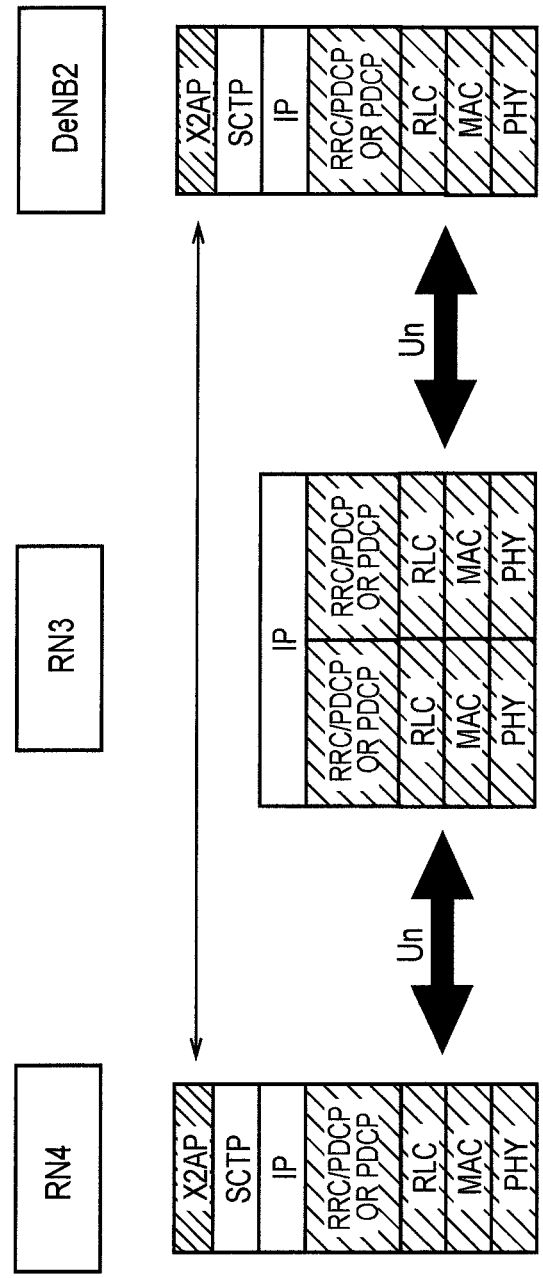
FIG. 6 is a diagram showing the protocol stack of the mobile communication system according to a third embodiment of the present invention.
Figure 7:
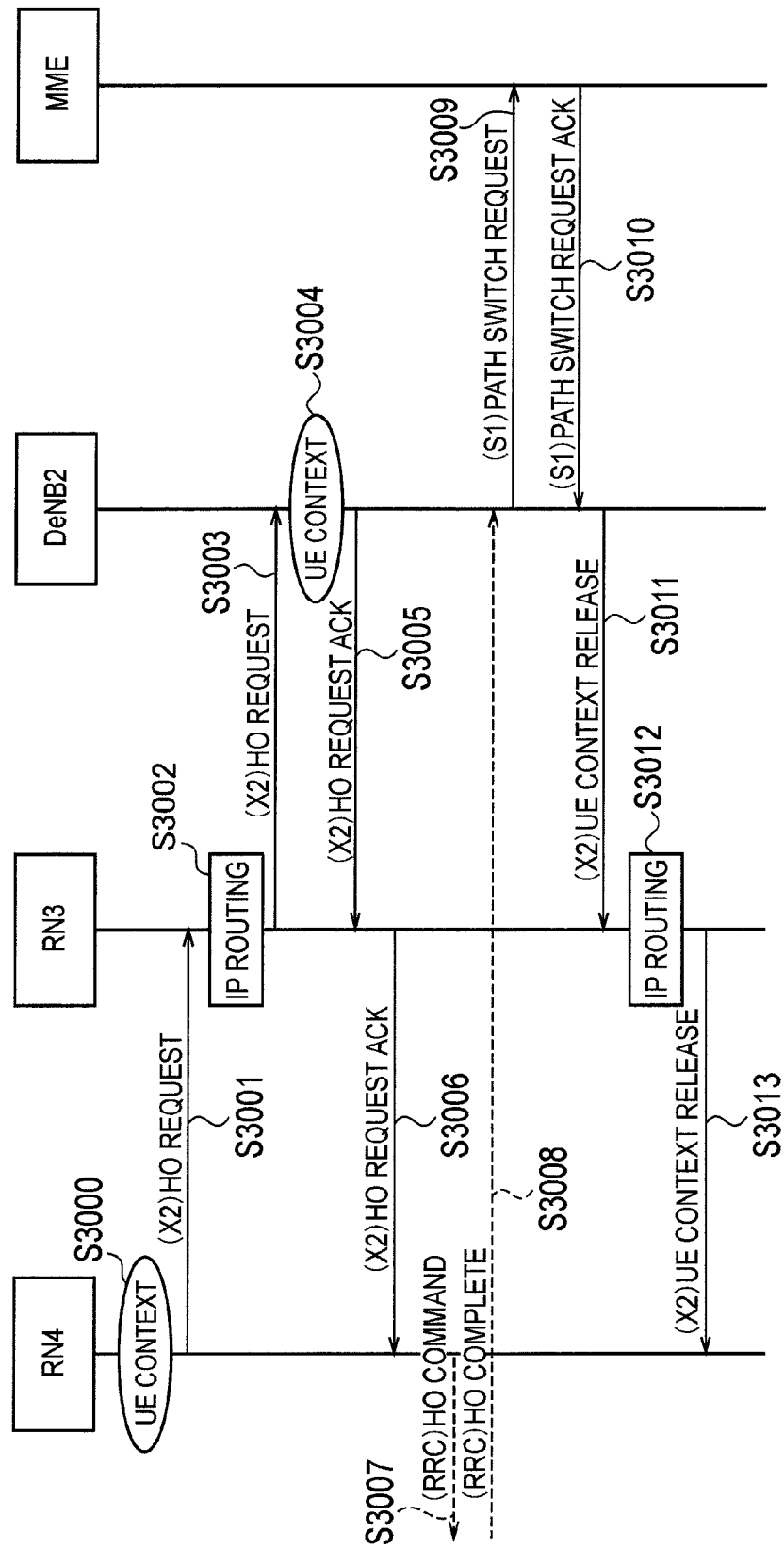
FIG. 7 is a sequence diagram illustrating the operation of the mobile communication system according to the third embodiment of the present invention.
Figure 8:
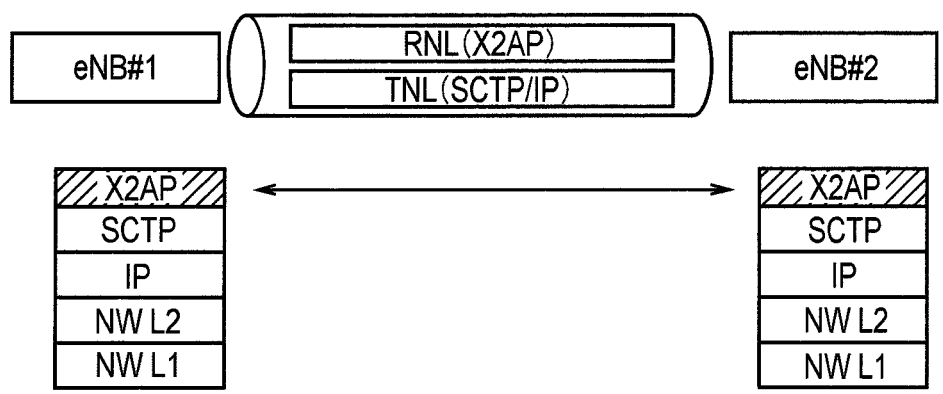
FIG. 8 is a diagram showing the protocol stack of a current mobile communication system.

Mobile Communication System According to a Third Embodiment of the Present Invention A description will be provided for the mobile communication system according to a third embodiment of the present invention, with reference to FIG. 6 and FIG. 7. The mobile communication system according to the third embodiment of the present invention will be described below by focusing on the differences from the mobile communication system according to the first embodiment described above.

Specifically, as illustrated in FIG. 6, the relay node RN3 includes an X2-C radio bearer function configured to set an X2-C radio bearer (Un interface) with the relay node RN4 and the radio base station DeNB2.

Also, the relay node RN3 includes an IP layer function as an upper layer function of the X2-C radio bearer function, but does not include an SCTP layer function and X2AP layer function as upper layer functions of the IP layer function.

Further, the protocol stack of the radio base station DeNB2 and the relay node RN4 is the same as the protocol stack of the mobile communication system according to the first embodiment as illustrated in FIG. 2.

A description is provided below with reference to FIG. 7 for the operation in the mobile communication system according to this embodiment where the mobile station UE is configured to conduct a handover from a first state in which a radio bearer is set with the relay node RN4 in order to communicate via the relay node RN4, the relay node RN3, and the radio base station DeNB2, to a second state in which a radio bearer is set with the radio base station DeNB2 in order to communicate via the radio base station DeNB2.

As illustrated in FIG. 7, the relay node RN4, which manages the "UE Context" of the mobile station UE, decides to perform a handover process from the first state of the mobile station UE to the second state thereof in step S3000, and then sends an "HO Request (handover request signal)", requesting a handover by the mobile station UE from the relay node RN4 to the radio base station DeNB2 in step S3001, to the relay node RN3 via the X2-C radio bearer.

The relay node RN3, upon receiving the "HO Request" in step S3002 by means of the IP layer function, transfers the "HO Request" to the radio base station DeNB2 via the X2-C radio bearer in step S3003.

The radio base station DeNB2, upon receiving the "HO Request", stores the "UE Context" of the mobile station UE in step S3004, and sends an "HO Request Ack (handover request acknowledgement signal)" to the relay node RN3 via the X2-C radio bearer in step S3005.

The relay node RN3, upon receiving the "HO Request Ack" by means of the IP layer function, transfers the "HO Request Ack" to the relay node RN4 via the X2-C radio bearer in step S3006.

In step S3007, the relay node RN4 sends an "HO Command (handover instruction signal)" to the mobile station UE by means of the RRC layer function, in order to instruct a handover to the radio base station DeNB2.

In step S3008, the mobile station UE sends an "HO Complete (handover completion signal)" to the radio base station DeNB2 by means of the RRC layer function.

In step S3009, the radio base station DeNB2 sends a "Path Switch Request (path switch request signal)" to the mobile switching center MME via the S1-MME interface.

In step S3010, the mobile switching center MME sends a "Path Switch Request Ack (path switch request acknowledgement signal)" to the radio base station DeNB2 via the S1-MME interface, and also switches the transfer destination for signals addressed to the mobile station UE from the relay node RN4 to the radio base station DeNB2.

In step S3011, the radio base station DeNB2 sends the "UE Context Release" to the relay node RN3 via the X2-C radio bearer.

The relay node RN3, upon receiving the "UE Context Release" by means of the IP layer function in step S3012, transfers the "UE Context Release" to the relay node RN4 via the X2-C radio bearer in step S3013, such that the relay node RN4 terminates management of the "UE Context" of the mobile station UE in reaction to the "UE Context Release".

Note that operation of the above described the mobile station UE, the relay node RN, the radio base station eNB and the mobile switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the relay node RN, the radio base station eNB and the mobile switching center MME. Also, the storage medium and the processor may be provided in the mobile station UE, the relay node RN, the radio base station eNB and the mobile switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A handover method, comprising:
   a step of connecting a first relay node and a second relay node via a radio bearer and connecting the second relay node and a radio base station via a radio bearer;
   a step of switching a mobile station from a first state where the radio bearer is set with the first relay node in order to communicate via the first relay node, the second relay node, and the radio base station to a second state where the radio bearer is set with the radio base station in order to communicate via the radio base station;
   a step in which the first relay node transmits a first handover request signal to the second relay node;
   a step in which upon receiving the first handover request signal, the second relay node transmits a second handover request signal to the radio base station;
   a step in which upon receiving the second handover request signal, the radio base station transmits a first handover request confirmation signal to the second relay node;
   a step in which upon receiving the first handover request confirmation signal, the second relay node transmits a second handover request confirmation signal to the first relay node; and
   a step in which upon receiving the second handover request confirmation signal, the first relay node transmits a handover instruction signal to instruct to hand over to the radio base station, to the mobile station.

2. A mobile communication system in which two relay nodes are connected in series under a radio base station, the first relay node and the second relay node are connected via a radio bearer and the second relay node and the radio base station are connected via a radio bearer, wherein:
   the first relay node and the radio base station comprise: as a radio bearer function of setting a Un interface with the second relay node, a physical layer function; an MAC layer function provided as an upper layer function of the physical layer function; an RLC layer function provided as an upper layer function of the MAC layer function; a PDCP layer function provided as an upper layer function of the RLC layer function; and an RRC layer function provided as an upper layer function of the PDCP layer function, the first relay node and the radio base station comprise: an IP layer function as an upper layer function of the radio bearer function; an SCTP layer function provided as an upper layer function of the IP layer function; and an X2AP layer function provided as an upper layer function of the SCTP layer function, the second relay node comprises: as a radio bearer function of setting a Un interface with the first relay node and the radio base station, a physical layer function; an MAC layer function provided as an upper layer function of the physical layer function; an RLC layer function provided as an upper layer function of the MAC layer function; a PDCP layer function provided as an upper layer function of the RLC layer function; and an RRC layer function provided as an upper layer function of the PDCP layer function, the second relay node comprises: an IP layer function as an upper layer function of the radio bearer function; an SCTP layer function provided as an upper layer function of the IP layer function; and an X2AP layer function provided as an upper layer function of the SCTP layer function, and a control signal relating to a handover process is configured to terminate between the X2AP layer function of the first relay node and the radio base station, and the X2AP layer function of the second relay node, wherein the handover process comprises switching a mobile station from a first state where the radio bearer is set with the first relay node in order to communicate via the first relay node, the second relay node, and the radio base station to a second state where the radio bearer is set with the radio base station in order to communicate via the radio base station.

* * * * *